United States Patent [19]

Steigman

[11] Patent Number: 4,769,054

[45] Date of Patent: Sep. 6, 1988

[54] ABATEMENT OF VAPORS FROM GAS STREAMS BY SOLIDIFICATION

[75] Inventor: Frederic N. Steigman, Ossining, N.Y.

[73] Assignee: Union Carbide Corporation, Danbury, Conn.

[21] Appl. No.: 110,845

[22] Filed: Oct. 21, 1987

[51] Int. Cl.⁴ ............................................... F25J 5/00
[52] U.S. Cl. .......................................... 62/12; 62/541; 55/267
[58] Field of Search ................... 62/12, 532, 533, 541; 55/267

[56] References Cited

U.S. PATENT DOCUMENTS

| | | | |
|---|---|---|---|
| 3,126,334 | 3/1964 | Harlow | 62/533 |
| 3,344,616 | 10/1967 | Owen | 62/541 |
| 3,400,512 | 9/1968 | McKay | 62/12 |
| 3,535,210 | 10/1970 | Linde et al. | 62/333 |
| 3,535,345 | 10/1970 | Egbert | 260/346.4 |
| 4,122,684 | 10/1978 | Clarkson et al. | 62/54 |
| 4,150,494 | 4/1979 | Rothchild | 34/28 |
| 4,150,958 | 4/1979 | Jablin | 55/267 |
| 4,237,700 | 12/1980 | Rothchild | 62/514 R |
| 4,464,904 | 8/1984 | Steigman | 62/52 |
| 4,551,981 | 12/1985 | Banerjee | 62/70 |

FOREIGN PATENT DOCUMENTS 1582955  1/1981  United Kingdom .

*Primary Examiner*—Ronald C. Capossela
*Attorney, Agent, or Firm*—Shirley L. Church

[57] ABSTRACT

A process for abatement of warm melting point vapors from gas streams is provided. The warm melting point vapors are solidified by direct contact with a chilled liquid, and are subsequently removed from the chilled liquid using known separation techniques. The chilled liquid exhibits a vapor pressure at the contacting temperature which is sufficiently low to preclude unsafe levels of the chilled liquid vapor in the processed gas stream. The chilled liquid is cooled using indirect heat exchange with a cryogenic liquid and is recycled.

7 Claims, 2 Drawing Sheets

ABATEMENT OF VAPORS FROM GAS STREAMS BY SOLIDIFICATION

BACKGROUND OF THE INVENTION

1. Field of the Invention

The present invention relates to a process and apparatus for abatement of warm melting point vapors from gas streams.

2. Background Art

Manufacturing plants which have cryogenic liquids available for use in plant processes are finding it advantageous to use boiling cryogenic liquids as the heat transfer medium in the recovery of volatile materials from effluent gas streams. Often the volatile materials to be recovered require an excessively low separation temperature or the gas streams from which the volatile materials are to be recovered are generated intermittently and therefore it is not practical to use mechanical refrigeration to provide the heat transfer capability for condensing the volatile materials out of the gas streams.

The heat exchange between the effluent gas stream and the cryogenic liquid may be direct or indirect. The heat exchange method is typically indirect if it is desired to maintain the cryogenic material at pressure and/or free from contamination so the vaporized cryogen can be re-used in other processes.

A commonly used process for indirect heat transfer employs a shell and tube exchanger, wherein a liquid or partially vaporized cryogen flows through one side of the exchanger and the effluent gas flows through the other side of the exchanger. Direct heat exchange between the liquid cryogen and the effluent gas can be accomplished using any method by which the liquid cryogen contacts the effluent gas, such as a downward spray of the liquid cryogen upon an upwardly rising volume of gas. U.K. Pat. No. 1,582,955 to R. W. Watson et al., entitled: CONDENSATION OF THE VAPOR OF A VOLATILE LIQUID, describes processes like those discussed above in more detail.

The following patents and abandoned patent application disclose subject matter related to the present invention: U.S. Pat. No. 4,150,494 to R. D. Rothchild, entitled Methods and Apparatus for Recovering Solvents; U.S. Pat. No. 4,237,700 to R. D. Rothchild, entitled Methods and Apparatus for Providing Refrigeration; U.S. Pat. No. 4,122,684 to M. J. Clarkson, et al., entitled Method For The Recovery of Volatile Liquids; U.S. Pat. No. 4,464,904 to F. N. Steigman, entitled Process for the Transfer Of Refrigeration; U.S. Pat. No. 4,551,981 to R. Banerjee, entitled Heat Exchange Methods and Apparatus; U.S. Pat. No. 3,535,345 to R. B. Eghert, entitled Method of Producing Phthalic Anhydride, and published patent disclosure, Federal Republic of Germany, No. P 24 11 601.6, K. M. Pohl, entitled Process For The Reduction of Emissions During The Storage and Loading of Volatile Liquids And Device For Carrying Out Such Process.

With the exception of U.S. Pat. No. 3,535,345 to R. B. Eghert, the above processes utilize a cryogenic liquid (a liquid with a normal boiling temperature below about −200° F.) as the heat transfer medium in the recovery by condensation of volatile materials from gas streams.

The methods and means disclosed in the above-referenced cryogenic technology are deliberately restricted to avoid the solidification of volatile materials in the incoming gas stream upon defined heat exchange surfaces (which would foul the exchange surfaces). One approach to the fouling problem has been to eliminate the defined heat exchange surfaces by directly contacting the incoming gas stream or its refluxed condensate with vaporizing cryogen. This approach causes loss of cryogen pressure and contamination of the cryogen by constituents of the gas stream. Thus, the vaporized cryogen used in this direct contact approach is typically vented to atmosphere. The non-recoverability of the cryogen for use as a clean gas at pressure adds greatly to process cost and adds to the volume of gas containing volatiles which is vented to atmosphere. The relatively large gas volume of the vaporizing cryogen tends to loft condensate droplets of the volatiles to be recovered out of the condenser, subverting the process objective which is volatile abatement or recovery.

Many of the advantages encountered by direct contact of the vaporizing cryogen with the incoming gas stream (from which volatiles are to be removed) can be avoided by imposing a suitable intermediary heat exchange fluid between the vaporizing cryogen and the incoming gas stream. Several of the references cited above disclose the use of such an intermediary heat exchange fluid. The intermediary fluid can be indirectly cooled by the cryogen to a bulk temperature above its melting point and then may undergo either direct or indirect heat exchange with the incoming gas streams from which volatile components are condensed, at temperatures exceeding the volatile component melting points. This technique avoids fouling of the defined surfaces of any indirect heat exchangers.

When the chilled intermediary fluid is directly contacted with the incoming gas stream, the above references recommend use of a liquid condensate of one or more of the volatile constituents of the incoming gas stream as the chilled fluid. The references also recommend the removal of any materials which freeze at high temperatures (such as moisture at 32° F.) from both the intermediary fluid and the incoming gas stream prior to implementation of the volatiles recovery method, to avoid freezing of such materials and fouling of indirect heat exchange surfaces between the chilled intermediary fluid and the vaporizing cryogen. It has also been suggested that during indirect heat exchange between the intermediary cooling fluid and the vaporizing cryogen, the temperature of the warm end of the heat exchanger (where the intermediary fluid first enters the exchanger) be controlled to be at least 32° F. to prevent freezing out of any moisture at this location in the exchanger.

There are applications wherein volatile abatement (to particularly low concentrations) is required or wherein the gas stream entering the volatiles reduction operation comprises a volatile material which tends to freeze out (solidly) at relatively high temperatures (such as water at 32° F.). Such applications are not adequately addressed by the referenced cryogenic art. Particularly in volatiles abatement situations, the specified concentration of volatiles permissible in the gas stream exiting the volatiles reduction operation requires an exiting gas stream temperature which is below the melting point of one or more of the volatile constituents. Such a process will necessarily form the solid phase of one or more of the incoming volatile constituents.

In addition, many of the cryogenic processes for volatiles reduction require continuous operation. The methods of volatiles reduction from gas streams disclosed in the cited art require at least one of the following: (1) a pretreatment of the gas stream to remove moisture and/or other high melting point volatiles; (2) limitation of the heat exchange temperature within at least a portion of the volatiles recovery operation to temperatures above the warmest melting point of gas stream volatile materials; (3) duplication of heat exchange equipment to permit regeneration (solids removal from) of heat exchange surfaces. Substantial economies both in terms of capital equipment outlay and/or in costs of operation can be achieved by eliminating the need for any of the three above means within the cryogenic process for volatiles removal.

SUMMARY OF THE INVENTION

The present invention provides a process and apparatus for the reduction or abatement of warm melting point vapors from gas streams. The warm melting point vapors are solidified by direct contact between the gas stream and a chilled liquid, and are subsequently removed from the chilled liquid using conventional liquid-solids separation techniques. The chilled liquid must exhibit a vapor pressure at the contacting temperature which is low enough to preclude unsafe or uneconomic levels of the chilled liquid vapor in the processed gas stream. The chilled liquid is recycled within the process, wherein it is cooled using indirect heat exchange with a cryogenic liquid.

By using solidification rather than condensation of the warm melting point vapors, the temperature at which the vapors are removed is significantly lower, thereby reducing the vapor pressure of both the warm melting point vapors and the chilled liquid used to remove them from the effluent gas stream. These lower vapor pressures result in a processed gas stream containing reduced warm melting point vapor and reduced chilled liquid components. Selection of a chilled liquid in which the solidified warm melting point vapors have minimal solubility is helpful in reducing the warm melting point vapor content of the recycled chilled liquid (thereby further reducing the warm melting point vapor content of the processed gas stream) and in reducing the viscosity of the chilled liquid in some cases, thereby improving fluid flow characteristics in the chilled liquid recycle loop.

As used in the present specification and claims, the following terms shall have the following meanings:

Contacting temperature: the temperature of the chilled liquid as it is brought into contact with the incoming gas stream to the volatiles reduction process. The contacting temperature is determined by the specific volatiles content limitations placed on the gas stream exiting the volatiles reduction process.

Warm melting point vapors: the constituents of the gas stream incoming to the volatiles reduction process whose melting points are above the intermediary cooling liquid contacting temperature, and which thus solidify upon contacting said liquid. Typical hydrocarbon warm melting point vapors, which are intended to be exemplary but not limiting, include benzene (normal melting point (nmp)=41° F.), carbon tetrachloride (nmp=10° F.) and 1,1,1 trichloro ethane (nmp=−24° F.). Typical non-hydrocarbon warm melting point vapors, intended to be exemplary but not limiting, include water (nmp=32° F.), bromine (nmp=19° F.) heavy water, $D_2O$, (nmp=39° F.), hydrazine, $NH_2NH_2$ (nmp=36° F.), and hydrogen peroxide, $H_2O_2$, (nmp=31° F.).

Also included as non-hydrocarbon warm melting point vapors, intended to be exemplary but not limiting, are vapors of relatively low-molecular-weight metallic compounds such as nickel carbonyl, $Ni(CO)_4$, (nmp=−13° F.), selenium oxyfluoride, $SeOF_2$, (nmp=40° F.), and vanadium tetrachloride, $VCl_4$, (nmp=−18° F.).

Chilled liquid: the liquid used to solidify at least a portion of the vapors/volatiles in the incoming gas stream with which the chilled liquid is contacted. Note that some vapors/volatiles may be condensed upon the contact with the chilled liquid incidental to the warm melting point vapors which are solidified. The chilled liquid melting point must be lower than the melting point temperature of any of the warm melting point vapors intended to be removed or abated from the incoming gas stream, and should typically be substantially below such vapor melting points, to minimize the potential build up of frozen (solidified) chilled liquid on the vaporizing cryogen indirect heat exchange surface. The actual bulk temperature of the chilled liquid will typically be maintained at or slightly below the contacting temperature. The vapor pressure of the chilled liquid at the contacting temperature must be sufficiently low to preclude unsafe levels of chilled liquid in the gas stream exiting the process. In addition, the viscosity of the chilled liquid at the bulk temperature should be sufficiently low to permit it to be pumped and to efficiently contact the gas stream within the volatiles reduction process. Examples of suitable chilled liquids, not intended to be limiting, include ethyl alcohol (nmp=−179° F.) and acetone (nmp=−140° F.). The volume concentrations of these substances in an equilibrated, one atmosphere, −50° F. processed gas stream would be approximately 0.040 percent and 0.44 percent, respectively.

Unsafe levels of the chilled liquid vapors in the gas stream exiting the process: concentrations of chilled liquid vapors which exceed applicable health or flammability standards designated to protect persons and property.

Health standards are available from sources such as OSHA, the EPA and other governmental agencies which provide health and safety standards. Exemplary of such health standards, not intended to be limiting, are the threshold limit values (TLV) of substances as issued by the American Conference of Governmental Industrial Hygienists (usually provided on the basis of concentration in air, but which can be converted to concentration in a nonhazardous gas). The TLV values represent conditions under which it is believed that nearly all workers may be repeatedly exposed day after day without adverse effect. The amount and nature of the information available for establishing a TLV varies from substance to substance and is subject to updating. Thus, the latest documentation should be consulted in determining the most recent guidelines for the control of health hazards.

Explosive concentration limits (LEL) and flammability information are available from sources such as the "Fire Protection Guide on Hazardous Materials" published by the National Fire Protection Association. Uneconomical levels of chilled liquid vapors: concentrations of chilled liquid in the gas stream exiting the volatiles reduction process which cause the present process to be more expensive than alternate technologies for achieving the same recovery of abatement result.

Cryogenic Liquid: a liquified atmospheric component such as nitrogen, oxygen or argon, supplied at a temperature below about −200° F.

The device enabling heat exchange between the intermediary chilled liquid and vaporizing cryogen (illustrated as a coil of tubing) is contained within the vessel used for direct contact heat exchange between the incoming gas stream and the intermediary chilled liquid.

Figure 1:
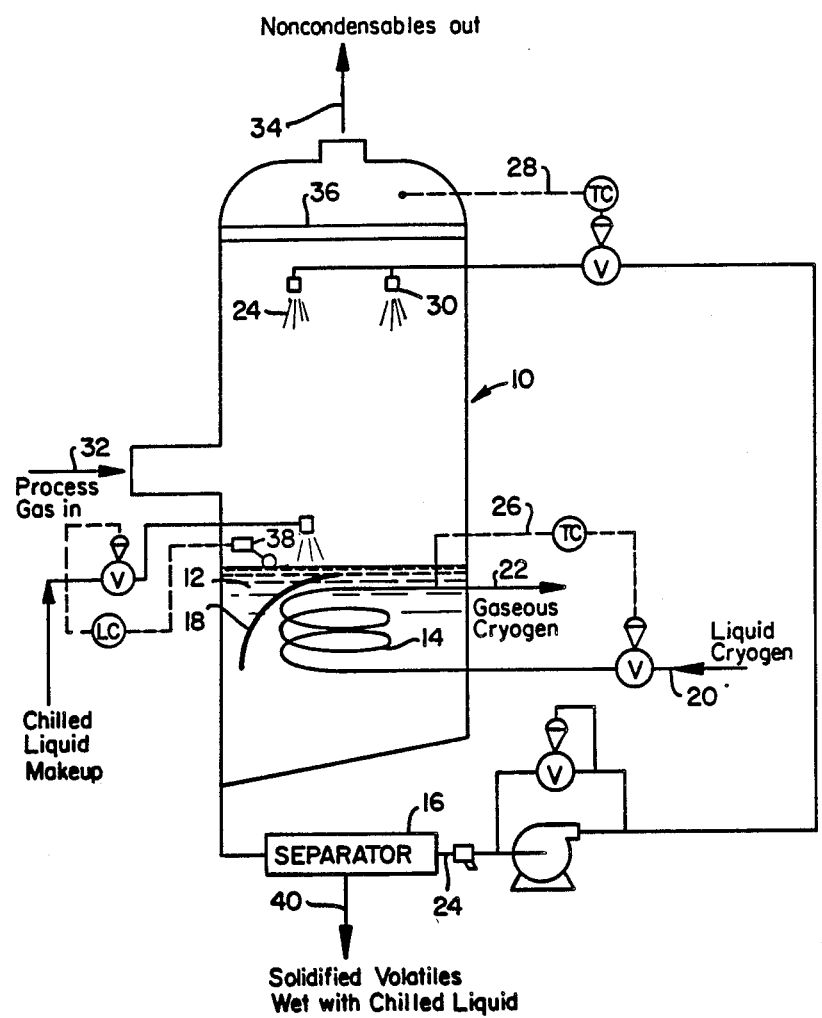
FIG. 1 illustrates a preferred embodiment of apparatus, in accordance with the present invention, for removal of warm melting point vapors from a process gas stream by solidification (freezing-out).
Figure 2:
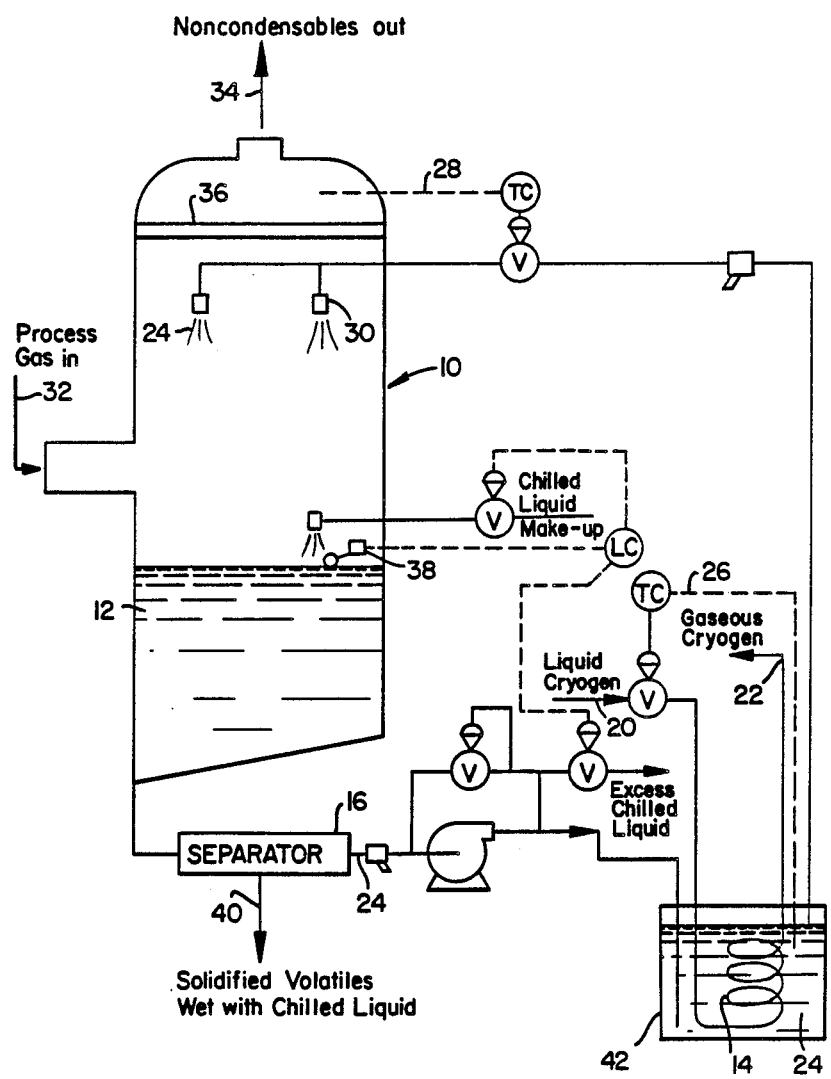

FIG. 2 illustrates a second apparatus preferred embodiment similar to that shown in FIG. 1; however, the device used to remove heat from the intermediary chilled liquid is located in a separate sealed vessel, to increase protection of the heat exchange surface of the device from the deposition of solidified warm melting point vapors.

DESCRIPTION OF THE PREFERRED EMBODIMENTS

The preferred process of the present invention comprises directly contacting a gas stream containing vapors/volatiles to be abated with a chilled liquid which is not a constituent of the vapors to be abated. The contacting chilled liquid is supplied at a temperature below the melting point of at least one of the constituents to be removed from the vapor stream. The contacting liquid must therefore have a melting point below the melting point of the vapors/volatiles to be removed by solidification. The contacting liquid must also have a vapor pressure at the contacting temperature which is low enough to preclude unsafe levels of its vapor in the processed gas stream. In addition, the contacting liquid should have a vapor pressure at the contacting temperature which does not result in uneconomical levels of its vapor in the processed gas stream. Chilled liquid which is carried out of the process along with the solidified warm melting point vapors (which are separated from the bulk of the chilled liquid and removed from the process) must be replaced during operation of the process, thereby representing a process cost.

The above preferred process enables the use of a temperature differential between the selected chilled liquid and the warm melting point vapors which is directly designed to optimize vapors/volatiles reduction to meet specific standards such as the TLV standards applied to the gas stream exiting the volatiles recovery process. The chilled liquid to be used can be selected based on physical and chemical data available from reference sources commonly used in the art.

In a less preferred process of the present invention, the chilled liquid is the condensate of any of the condensables in the incoming gas stream whose melting points are below the contacting temperature. The melting points of the condensate must be sufficiently lower than the melting points of the warm melting point vapors to be removed that the warm melting point vapors are solidified upon direct contact with the condensate. In addition, the amount of the chilled liquid vapors remaining in the gas stream must not be unsafe and should not be uneconomical. When the chilled liquid is the condensate of condensables in the incoming gas stream, the efficiency of separation of the solidified warm melting point vapors from the chilled liquid is less critical in terms of maintaining a given amount of chilled liquid within the process. Chilled liquid which is removed from the process along with the solidified warm melting point vapors is replaced at least in part by additional condensate generated during processing of the incoming gas stream, thereby reducing incremental processing costs. Any additional chilled liquid required must be supplied as make up directly to the process.

The apparatus used to facilitate the process of the present invention is best described in combination with a description of the process.

The contacting of a gas stream containing warm melting point vapors with a chilled liquid is typically done in a spray tower 10, as shown in FIG. 1, since such a tower is not as susceptible to fouling by solidified warm melting point vapors. The contacting device is not limited to a spray tower, however; a plate column, for example, might be used if the flushing action of the contacting chilled liquid is sufficient to prevent fouling. Another option would be to bubble the effluent gas through the contacting chilled liquid.

As shown in FIG. 1, the process gas 32 containing the warm melting point vapor is fed into the spray tower 10, wherein it is directly contacted by chilled liquid 24 impinged upon the process gas from the spray nozzles 30. The contact of the process gas with the chilled liquid results in solidification or freezing out of the warm melting point vapors, which solidified vapors are carried along with the chilled liquid into the pool of chilled liquid and solidified vapors 12 at the bottom portion of the spray tower 10.

The pool 12, comprising the slurry of contacting liquid and frozen vapors, is kept at the contacting temperature (or slightly below contacting temperature) by an immersed refrigeration coil 14. Liquid cryogen or vaporizing cryogen provides the cooling medium inside the coil 14. Typically liquid cryogen 20 would enter the refrigeration coil 14 and vaporized cryogen 22 would exit the coil. The heat exchange device need not be a coil as shown, but can be any indirect heat exchange device known in the industry so long as use of the device does not cause build up of solidified warm melting point vapors on the heat exchange surface of the device to an extent which renders the device inoperable.

A shroud or screen 18 can be used to prevent the solidified warm melting point vapors from impinging and layering upon the coil 14. The solidified warm melting point vapors are removed from the slurry 12 by the separator 16 and sent on for further processing as necessary, depending on the final desired use of the solidified vapors. The separator 16 may be any suitable apparatus known in the art, such as a flotation device, a settling tank, a filter, a centrifuge, etc. The chilled liquid 24 separated from the solidified warm melting point vapors is recycled to the spray nozzles 30 in the spray tower 10.

An alternative apparatus for chilling the contacting liquid is shown in FIG. 2. The heat transfer device, again shown as a coil 14, is located in a second insulated vessel 42 which is located downstream of the separator 16. This reduces the amount of fouling of the coil 14 by solidified warm melting point vapor impingement.

FIG. 2 also shows apparatus for removal of excess chilled liquid which may be required if the contacting liquid is the condensate of at least one of the constituents of the incoming gas stream, since the rate of condensation of the contacting liquid constituent may exceed the rate at which condensate leaves the process with the solidified volatiles stream 40. Apparatus for removal of excess chilled liquid can also be used in combination with the apparatus shown in FIG. 1.

If the duty cycle of the apparatus and the properties of the chilled liquid tend to cause excessive deposits of frozen chilled liquid on the refrigeration coil 14, a second coil (not shown) may be located in the pool at the bottom of the spray tower/contactor 10, as shown in FIG. 1 or in the alternate cooling vessel 42 as shown in FIG. 2. The second coil can be placed in use while the fouled coil is defrosted either by the warmer bulk temperature of the surrounding liquid or by the action of warm cryogen vapor forced through the fouled coil. It is preferred, however, to select a chilled liquid which reduces or avoids the formation of deposits of chilled liquid on the heat exchange device, thus reducing total equipment costs. Once the necessary contacting temperature has been calculated, based on reference data available within the art, a list of potential chilled liquids capable of providing the contacting temperature and of meeting vapor pressure requirements at that temperature can be tabulated. Minimal experimentation using techniques known in the art can be conducted to determine which of the chilled liquids on the list will provide minimal deposits of frozen chilled liquid on the heat exchange device (such as a refrigeration coil).

EXAMPLE 1

The following Example is presented to further illustrate the invention and is not intended to be limiting.

It is desired to abate carbon tetrachloride (nmp = $-10°$ F.) from a gas stream comprising air and carbon tetrachloride at atmospheric pressure. The desired concentration of carbon tetrachloride in the gas stream exiting the volatiles recovery process is 0.017 volume percent, corresponding to a vapor pressure of 0.0025 psia. The vapor pressure curve for carbon tetrachloride indicates the required vapor pressure corresponds to an equilibrated vapor temperature of about $-90°$ F. Thus, the abatement criteria will not be met by removing the carbon tetrachloride at a temperature above $-90°$ F.

Referring again to FIG. 1, the following is a process for accomplishing the above objective. The contacting chilled liquid 24, is comprised of acetone liquid at about $-90°$ F. The process gas 32 is comprised of air containing carbon tetrachloride wherein the concentration of carbon tetrachloride is about 2.0 volume percent. Acetone has low solubility in carbon tetrachloride at the contacting temperature (about $-90°$ F.) and its low melting point ($-140°$ F.) minimizes buildup on the immersed coil 14. A shroud or screen 18 can be used to keep the carbon tetrachloride precipitate from building up on the coil 14. The liquid cryogen 20 used to cool the slurry 12 comprising acetone and solidified carbon tetrachloride is liquid nitrogen, which enters the coil 14 at a temperature of about $-320°$ F. The acetone contacting liquid 24 is directly contacted with the incoming process gas 32 in the form of a spray exiting nozzles 30. The direct contact between the acetone contacting liquid 24 and the incoming gas 32 causes solidification of the carbon tetrachloride which is carried with the acetone into the bottom of the spray tower 10, to form a slurry 12 in the bottom of spray tower 10. The slurry 12 is processed through a liquid-solids separator 16 (of the kind previously discussed) whereby solidified carbon tetrachloride wet with chilled liquid 40 is removed from the acetone contacting liquid. The separated acetone contacting liquid 24 is then pumped to the spray nozzles 30. One temperature controller 26 maintains the pool of slurry 12 temperature by varying the liquid nitrogen 20 flow rate, while a second temperature controller 28 maintains the temperature of the leaving effluent 34 by varying the flow to the spray nozzles 30. A demister pad 36 may be required to trap any particulates and contacting liquid droplets which are convected up by the leaving noncondensibles stream 34. The volume concentration of acetone in the gas 34 exiting the process is about 0.061 volume percent, which value is well below the threshold limit value (TLV) and the lower explosive limit (LEL) for acetone.

A contacting liquid level control system 38 is required for continuous operation to replace contacting chilled liquid lost with the separated solidified warm melting point vapors 40.

An alternative apparatus for chilling the contacting liquid 24 is shown in FIG. 2. The device for indirect heat exchange between the contacting liquid and the cryogen, shown as a refrigeration coil 14, is located in a separate sealed vessel 42. In this case, the slurry 12 comprising acetone and solidified carbon tetrachloride is processed through the separator 16 to remove the solidified carbon tetrachloride from the acetone contacting liquid. The separated acetone contacting liquid 24 is pressured or pumped to the cooling vessel 42 wherein the acetone contacting liquid 24 is chilled by indirect heat transfer with the vaporizing cryogen passing through refrigeration coil 14.

EXAMPLE 2

The following test was made to determine the nature of a typical chilled liquid/solidified warm melting point vapor mixture which would be formed by the process of the present invention.

About one quart of ethanol was chilled to $-100°$ F. using dry ice in an open-mouth Dewar. After it was determined that no dry ice crystals remained in the bottom of the Dewar, a water mist was sprayed down into the Dewar from a height of about 18 inches using a Spraying Systems Co. Hydraulic Atomizing Nozzle #¼ LNN-2 at 60 psig for one minute (2.5 gallon per hour rating at 60 psig). The resulting mixture was filtered through a 100 mesh ASTM screen and the filtrate was caught in a bucket below.

A bed of wet granules was retained on the screen, which bed turned to slush as it warmed up. Examination of the material in the bucket below indicated no solids.

The above procedure was repeated using ASTM screens with increased opening size, to determine the opening size which produces the most rapid and complete separation without permitting the passage of crystals with the filtrate. No granules were observed to pass through ASTM screen sizes #50 and #30. A few small granules were observed to have passed through ASTM screen size #20.

The amount of ethanol remaining on the granules after filtering was not determined during the above testing, but could be determined by standard analytical techniques or by doing standard material balance calculations for measured water and ethanol quantities at various steps during the determination.

The process of the present invention requires that the solidified warm melting point vapors be separable from the slurry of warm melting point vapors and contacting chilled liquid. The warm melting point vapors removed may comprise only a portion of the total volatiles to be removed from the incoming gas and other volatiles to be removed may be condensed and removed as part of the slurry formed in the bottom of the spray tower. Such condensed volatiles may be separated from the contacting liquid using standard liquid-liquid separation techniques prior to recycle of the contacting liquid to the spray nozzles, or such condensed volatiles may be used as at least part of the contacting liquid.

The embodiments of the invention described above are not intended to be limiting, as one skilled in the art will recognize that numerous substitutions, modifications and alterations are permissible without departing from the spirit and scope of the invention, as demonstrated in the following claims.

What is claimed is:

1. A process for abatement of warm melting point vapors from a gas, comprising:
   (a) directly contacting said gas with a chilled liquid at a temperature at which said warm melting point vapors solidify, wherein said contacting temperature is sufficiently low that the vapor pressure of said chilled liquid precludes unsafe levels of said chilled liquid vapor in said gas after processing; and
   (b) providing indirect heat exchange between said chilled liquid and a cryogenic liquid, whereby said chilled liquid is cooled to a temperature at least as low as said contacting temperature.

2. The process of claim 1 which includes the additional step of:
   (c) separating at least said solidified warm melting point vapors from a slurry comprising said solidified warm melting point vapors and said chilled liquid.

3. The process of claim 2 wherein said chilled liquid is recycled within said process and wherein said solidified warm melting point vapors are removed from said chilled liquid prior to said indirect heat exchange between said chilled liquid and said cryogenic liquid.

4. The process of claim 2 wherein said chilled liquid is recycled within said process and wherein said solidified warm melting point vapors are removed from said chilled liquid after said indirect heat exchange between said chilled liquid and said cryogenic liquid.

5. The process of claim 1, claim 2, claim 3, or claim 4, wherein said chilled liquid is a material other than a constituent of said gas stream.

6. An installation for abatement of warm melting point vapors from a gas, comprising: means for directly contacting said gas with a chilled liquid at a temperature at which said warm melting point vapors solidify, means for indirect heat exchange between said chilled liquid and a cryogenic fluid, whereby said chilled liquid is cooled to a temperature at least as low as said contacting temperature and wherein said contacting temperature is sufficiently low that the vapor pressure of said chilled liquid precludes unsafe levels of said chilled liquid vapor in said gas after processing, and means for passing said chilled liquid from said indirect heat exchange means to said direct contacting means.

7. The installation of claim 6 further comprising means for removal of said solidified warm melting point vapors from a slurry comprising said solidified warm melting point vapors and said chilled liquid.

* * * * *

UNITED STATES PATENT AND TRADEMARK OFFICE
CERTIFICATE OF CORRECTION

PATENT NO. : 4,769,054

DATED : September 6, 1988

INVENTOR(S) : Frederic N. Steigman

It is certified that error appears in the above-identified patent and that said Letters Patent is hereby corrected as shown below:

Col. 2, line 16, prior to "encountered", delete "advantages" and insert -- disadvantages --.

Col. 2, line 26, after "gas", delete "streams" and insert -- stream --.

Col. 4, line 11, after "upon", delete "the".

Col. 4, line 63 should begin a new paragraph.

Col. 4, line 67, after "recovery", delete "of" and insert -- or --.

Signed and Sealed this

Fourteenth Day of February, 1989

Attest:

DONALD J. QUIGG

Attesting Officer

Commissioner of Patents and Trademarks